G. R. LIVERGOOD.
PIPE ENGAGING SLIP FOR ROTARIES.
APPLICATION FILED SEPT. 20, 1920.

1,381,074.

Patented June 7, 1921.

INVENTOR
Gerald R. Livergood
BY
Hardway & Cathey
ATTORNEYS.

UNITED STATES PATENT OFFICE.

GERALD R. LIVERGOOD, OF HOUSTON, TEXAS, ASSIGNOR OF ONE-HALF TO CHARLES SNELL, OF HOUSTON, TEXAS.

PIPE-ENGAGING SLIP FOR ROTARIES.

1,381,074. Specification of Letters Patent. Patented June 7, 1921.

Application filed September 20, 1920. Serial No. 411,605.

*To all whom it may concern:*

Be it known that I, GERALD R. LIVERGOOD, a citizen of the United States, residing at Houston, in the county of Harris and State of Texas, have invented certain new and useful Improvements in Pipe-Engaging Slips for Rotaries, of which the following is a specification.

This invention relates to new and useful improvements in pipe engaging slips for rotaries.

One object of the invention is to provide a device of the character described adapted to be inserted in a rotary table around the drill stem, or other pipe for engagement therewith to hold the pipe suspended in the rotary while the joints thereof are being screwed together or unscrewed.

Another object is to provide pipe engaging slips which will fit closely around, and grip, the pipe on all sides.

With the above and other objects in view, the invention has particular relation to certain novel features of construction, operation and arrangement of parts, an example of which is given in this specification and illustrated in the accompanying drawings, wherein:—

Figure 1:
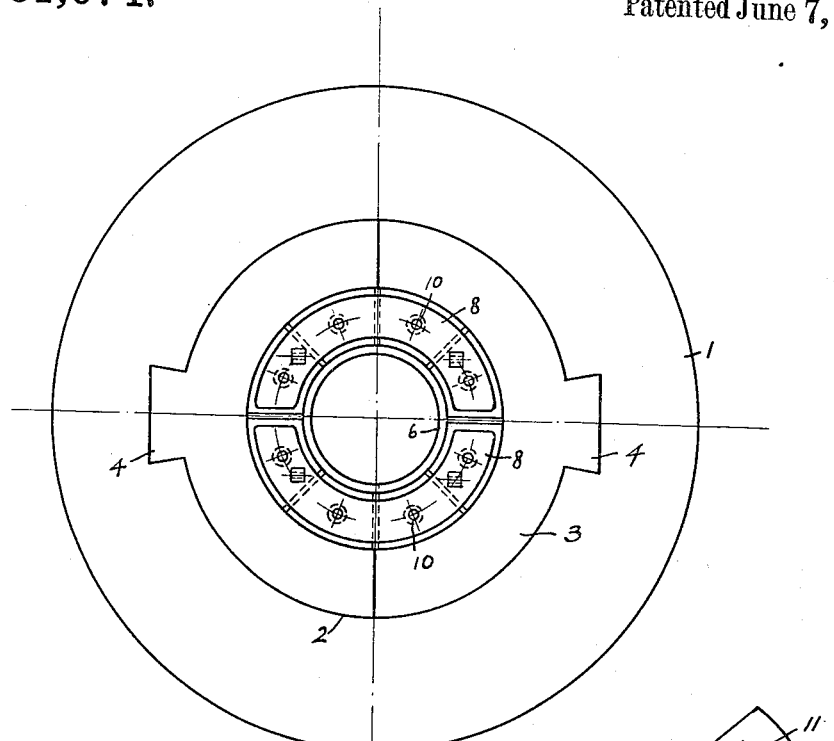
Figure 1 is a plan view of a rotary table, showing the slips therein clamped around a section of pipe.
Figure 3:
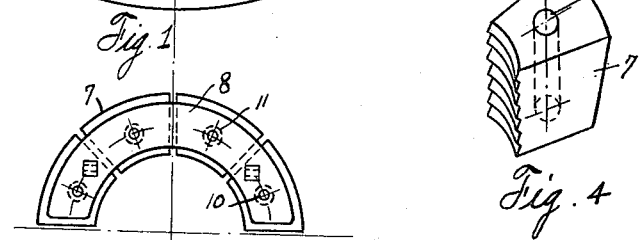
Fig. 3 shows a plan view of one of the slips.
Figure 4:
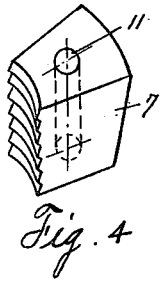
Fig. 4 shows a perspective view of one of the jaws employed.
Figure 2:
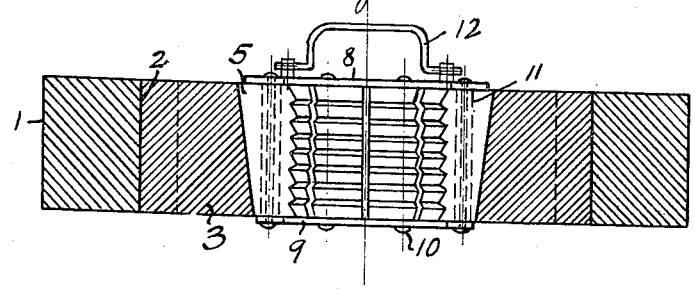
Fig. 2 shows a transverse sectional view.

Referring now more particularly to the drawings, the numeral 1 designates the rotary table having a central opening 2 to receive the removable bushing 3 which is locked to rotate therewith by means of the vertical ribs 4 which fit into corresponding grooves in the wall of the opening 2.

The bushing 3 has a central downwardly tapering hole 5 through which the drill stem 6 passes. In drilling the stem is locked for rotation with the rotary by the well known form of jaws, (not shown), but when it is desired to pull out, or let down, the stem 6, said jaws are removed and the slips, herein described, are used to hold the stem suspended in the bore while attaching additional joints to, or detaching them from the upper end thereof. Slips now commonly used do not engage with the stem all the way around, particularly where the stem is not perfectly round, and consequently oftentimes the stem slips through them and drops into the bore.

The slips herein described are preferably made in two sections and include the arcuate wedge-shaped jaws 7 which are mounted in a cage consisting of the upper and lower arcuate anchors, preferably of the form of plates 8 and 9 which anchor the bearing rods 10 and are anchored in spaced relation by said rods. The jaws 7 have vertical bearings 11 therethrough through which said rods pass, said bearings being somewhat larger than said rods to give the jaws the required amount of lateral adjustment and the jaws are spaced apart in their respective cages so as to give them the required range of movement for expansion and contraction. The inner sides of the jaws are toothed, as shown, so that they will engage with the pipe to be held.

In use, the slips are inserted in the bushing 3 around the pipe, and being wedge-shaped will wedge in between said pipe and the bushing 3, the teeth of the jaws engaging with and holding said pipe suspended in the bore while the joint above the slips is being attached or removed. It is obvious that said jaws will contract around the pipe and all of them will engage therewith and securely hold said pipe against slippage.

The slips are handled by means of a suitable bail 12, as shown.

What I claim is:—

1. A pipe engaging slip, including a cage composed of upper and lower arcuate plates, arcuate pipe engaging jaws between said plates and bearing rods passing through said jaws and anchored at their respective ends to the corresponding plates.

2. A pipe engaging slip, including a cage composed of upper and lower arcuate plates, bearing rods whose respective ends are anchored to the corresponding plates, pipe engaging jaws loosely mounted on said rods between said plates.

3. A pipe engaging slip, including a cage composed of upper and lower arcuate plates, bearing rods whose respective ends are anchored to the corresponding plates, pipe engaging jaws loosely mounted on said rods between said plates, said jaws being arcuate, wedge-shaped and having their inner surfaces toothed.

4. A pipe engaging slip, consisting of a plurality of independent units, each unit including a plurality of pipe engaging jaws and a holder whereby the jaws are held together as a unit, said jaws being radially movable with respect to the holder and with respect to each other.

5. In a device of the character described, a downwardly tapering seat and pipe engaging slips formed to fit into said seat, a cage including upper and lower segmental members spaced apart, bearing rods whose respective ends are anchored to the respective members, said rods passing through said slips.

6. In a device of the character described, a plurality of independent pipe engaging slips, including upper and lower anchor plates spaced apart, bearing rods connecting said plates rigidly together, and pipe engaging jaws mounted loosely on said rods so as to allow free play relative to the rods and plates.

7. A pipe engaging slip including segmental anchors, bearing rods connecting said anchors, and segmental jaws having longitudinal openings therein to receive said rods loosely, thereby permitting the free play of said jaws on said rods.

8. In a device of the character described, the combination of a tapered seat, a pipe engaging slip therein comprising a cage having upper and lower segmental members, and jaws mounted between said members and having lateral movement relative thereto and to each other.

9. In a device of the character described, the combination of a tapered seat, a pipe engaging slip therein, including upper and lower anchors and a plurality of pipe engaging jaws mounted loosely between said anchors to allow the free movement of said jaws relative to the anchors but within a predetermined range of movement.

10. In a device of the character described, the combination of tapered seat, a pipe engaging slip therein, including a plurality of supporting cages, each comprising a rigid supporting frame and toothed jaws mounted in said frame and having lateral movement relative to the frame and to each other.

In testimony whereof I have signed my name to this specification in the presence of two subscribing witnesses.

GERALD R. LIVERGOOD.

Witnesses:
R. M. SMITH,
E. V. HARDWAY.